United States Patent [19]

Horsey et al.

[11] Patent Number: 5,128,397
[45] Date of Patent: Jul. 7, 1992

[54] STABILIZED ETHYLENE-VINYL ACETATE COPOLYMER HOT MELT ADHESIVE SYSTEMS

[75] Inventors: Douglas W. Horsey, Briarcliff Manor; Ambelal R. Patel, Ardsley, both of N.Y.

[73] Assignee: Ciba-Geigy Corporation, Ardsley, N.Y.

[21] Appl. No.: 697,837

[22] Filed: May 9, 1991

[51] Int. Cl.⁵ .......................... C08K 5/10; C08K 5/32; C08K 5/3477; C08K 5/36
[52] U.S. Cl. ...................... 524/290; 524/62; 524/101; 524/114; 524/128; 524/133; 524/151; 524/153; 524/289; 524/330; 524/343; 524/349; 524/400; 524/488; 524/564
[58] Field of Search ............... 524/101, 153, 128, 291, 524/400, 488, 564, 114, 330, 290

[56] References Cited

U.S. PATENT DOCUMENTS

| | | | |
|---|---|---|---|
| 3,658,743 | 4/1972 | Bevilncqua | 524/124 |
| 4,360,617 | 11/1982 | Müller et al. | 524/101 |
| 4,835,200 | 5/1989 | St. Clair | 524/100 |
| 4,857,572 | 8/1989 | Meier et al. | 524/289 |
| 4,994,508 | 2/1991 | Shiraki et al. | 524/323 |

*Primary Examiner*—Paul R. Michl
*Assistant Examiner*—Tae H. Yoon
*Attorney, Agent, or Firm*—Luther A. R. Hall

[57] ABSTRACT

Hot melt adhesive compositions stabilized against thermal degradation, discoloration, skin formation and substantial viscosity changes, said adhesives being based on ethylene-vinyl acetate copolymer and a hydrocarbon tackifying resin and containing a stabilizer system of a hindered phenol antioxidant, a phosphite costabilizer and an acid scavenger.

29 Claims, No Drawings

STABILIZED ETHYLENE-VINYL ACETATE COPOLYMER HOT MELT ADHESIVE SYSTEMS

Hot melt adhesives, including those based on ethylene vinyl acetate copolymer, are especially susceptible to oxidation due to high temperature (180° C.) compounding, storage, handling and application. As the performance requirements for such adhesives increased, the use of antioxidants evolved to prevent discoloration, undesirable viscosity changes and skin formation on the surface of the adhesive. Hindered phenols were the primary antioxidant of choice fo stabilization of the adhesive systems.

A further approach to achieving stabilization beyond that provided by the hindered phenols involved the use of secondary antioxidants such as thiosynergists or phosphite stabilizers including triarylphosphites. The combination of primary and secondary antioxidants provided stabilization performance beyond that which could be expected based on the sum of the performance of the individual components.

A complication was, however, encountered by the frequent use of white or light colored hydrocarbon tackifying resins in adhesive formulations where good color stability is required. Thus, negative interactions were experienced with such hydrocarbon tackifiers as evidenced by way of gray-black discoloration upon heating. Since it was hypothesized that the interactions involved the phosphite costabilizer, the applicability of the latter has been substantially reduced. Accordingly, solutions to this problem are required which eliminate the discoloration effect while still preserving the effective properties provided by the presence of the tackifier and the phosphite costabilizer.

Background material on these issues are provided by the following: U.S. Pat. No. 4,360,617 which discloses blends of phenols and symmetrical triarylphosphites for stabilizing a broad range of organic polymers including elastomers and ethylene-vinyl acetate copolymers; U.S. Pat. No. 3,658,743 which discloses synergistic combinations of phenols, an organic sulfide or thioester and an epoxide or phosphite ester for the stabilization of hydrocarbon elastomers; U.S. Pat. No. 4,835,200 which discloses stabilizer systems of a thio compound, a phenolic antioxidant, a tris(nonylated phenyl)phosphite and an aliphatic compatible epoxy compound for use in various tackified block copolymer resin systems; and U.S. Pat. No. 4,857,572 which discloses (alkylthioalky)phenols with optional addition of phosphites for use in stabilizing various elastomers.

It has now been surprisingly discovered that a unique combination of primary and secondary antioxidants and of an acid scavenger substantially eliminates the aforementioned difficulties encountered in the stabilization of ethylene-vinyl acetate hot melt adhesives containing hydrocarbon tackifying resins. Thus, the blend of hindered phenol, phosphite and acid scavenger provides color stability while minimizing viscosity changes, heat degradation and skin formation. By facilitating the use of phosphite costabilizers, the combination provides stabilization properties which additionally exceed the performance of the individual state of the art antioxidants.

The primary components of the hot melt adhesive system are ethylene-vinyl acetate copolymer, a hydrocarbon tackifying resin and, optionally, petroleum derived waxes and various plasticizing oils.

The applicable tackifying resins may be described as hydrogenated and non-hydrogenated aliphatic petroleum hydrocarbon resins (preferably hydrogenated varieties) resulting from the polymerization of monomers consisting primarily of mono- and diolefins, hydrogenated and non-hydrogenated aromatic petroleum hydrocarbon resins and hydrogenated and non-hydrogenated alicyclic petroleum hydrocarbon resins. Additionally, hydrogenated and non-hydrogenated polyterpene hydrocarbon resins may be used as the tackifying resin. Mixtures of the above are also applicable. Such tackifying resins will be present in concentrations ranging from 10 to 90%, by weight, and preferably 25 to 50%, by weight. The particular resin will be selected on the basis of compatibility with the adhesive system, with colorless or white tackifiers being particularly preferred. ARKON P-90 from Arakawa Chemical, ESCOREZ 5300 from Exxon Chemical and REGALREZ 1094 from Hercules are typical commercial tackifying resins.

The petroleum derived waxes are optionally present in concentrations ranging from 0 to 50%, by weight, and serve to impart greater fluidity to the molten material, flexibility to the set adhesive and wetting characteristics. Paraffin and microcrystalline waxes with melting points of 55°–110° C. as well as polyethylene or Fischer-Tropsch waxes are illustrative of this component.

Plasticizing or extending oils may also be present in order to provide wetting action and viscosity control. Concentrations up to 50%, by weight, are applicable. Typical oils include olefin oligomers, vegetable and animal oils and naphthenic oils.

The combination of stabilizers which substantially eliminates heat degradation, color formation, undesirable viscosity changes and skin formation comprise (a) a hindered phenolic antioxidant;
(b) a phosphite co-stabilizer; and
(c) an acid scavenger.

Hindered phenols are well known to those skilled in the art and correspond to the formulae $$R_1X-(C_aH_{2a})-Q \qquad (I)$$

wherein $R_1$ is a group of the formula Ia,

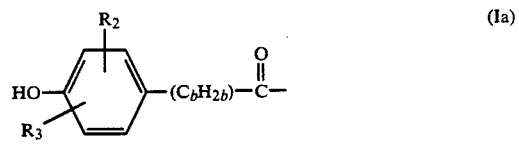

(Ia)

X is oxygen or sulfur, a is an integer from 6 to 30, preferably 6 to 18, b is an integer from 0 to 6, $R_2$ and $R_3$ are independently $C_1$–$C_{18}$alkyl, $C_5$–$C_{12}$cycloalkyl, phenyl or $C_7$–$C_9$aralkyl, and $R_2$ is also hydrogen, Q is hydrogen or $-A-(C_yH_{2y})-R_4$, A is oxygen, sulfur or

y is an integer from 2 to 20,

B is $C_1$–$C_4$alkyl or $C_1$–$C_4$alkanoyl, and $R_4$ is hydrogen, hydroxy, $C_1$–$C_4$alkanoyloxy or a group of the formula Ib,

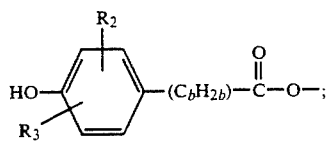  (Ib)

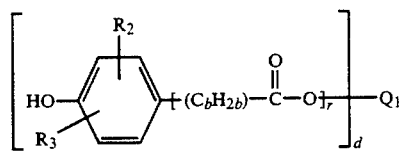  (II)

wherein R₂, R₃ and b are as defined above, r is 1, d is an integer from 2 to 6, and Q₁ is a divalent aliphatic hydrocarbon of 1 to 18 carbon atoms, a divalent aromatic or aromatic aliphatic hydrocarbon of 6 to 20 carbon atoms or a group of the formula IIa when r is also O

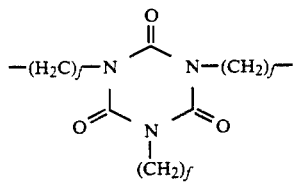  (IIa)

wherein f is an integer from 1 to 4;

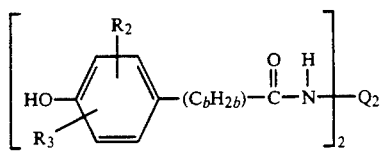  (III)

wherein R₂, R₃ and b are as defined above, and Q₂ is $C_1$–$C_{18}$alkylene;

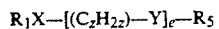  (IV)

wherein R₁ and X are as defined above, z is an integer from 2 to 6, e is an integer from 3 to 40, preferably 3 to 10, Y is oxygen or sulfur, and R₅ is hydrogen, $C_1$–$C_4$alkyl or a group of the formula Ia;

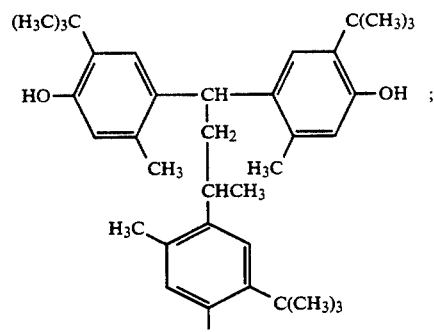  (V)

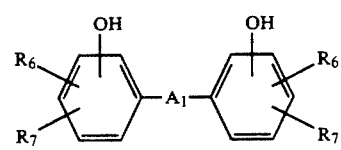  (VI)

wherein R₆ and R₇ are independently $C_1$–$C_{18}$alkyl, $C_5$–$C_{12}$cycloalkyl, phenyl or $C_7$–$C_9$aralkyl, and R₆ is also hydrogen, and A₁ is a group >C(R₈)R₉ wherein R₈ and R₉ are independently hydrogen or $C_1$–$C_6$alkyl;

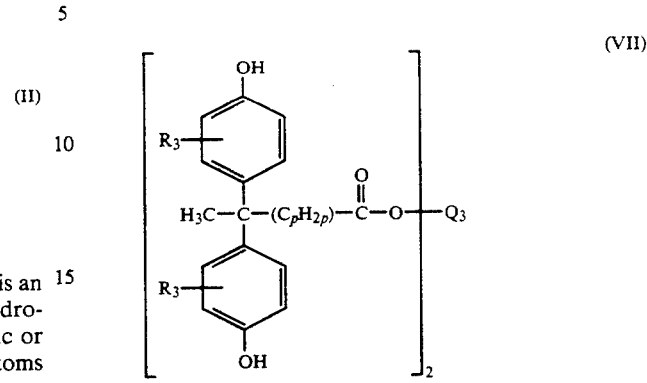  (VII)

wherein R₃ is as defined above, p is 1 or 2 and Q₃ is $C_2$–$C_{10}$alkylene; and

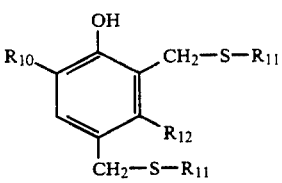  (VIII)

wherein
R₁₀ is $C_1$–$C_{10}$alkyl or $C_5$–$C_{12}$cycloalkyl,
R₁₁ independently is $C_1$–$C_{18}$alkyl, phenyl or benzyl and
R₁₂ is hydrogen or methyl.

Alkyl is for example methyl, ethyl, propyl, n-butyl, tert-butyl, pentyl, hexyl, heptyl, octyl, 1,1,3,3-tetramethylbutyl, nonyl, decyl, undecyl, dodecyl or octadecyl.

$C_1$–$C_{18}$alkyloxy is for example methoxy, ethoxy, propoxy, n-butoxy, tert-butoxy, pentyloxy, hexyloxy, heptyloxy, octyloxy, nonyloxy, decyloxy, undecyloxy, dodecyloxy or octadecyloxy.

$C_1$–$C_4$alkanoyl is for example acetyl, propionyl or butyryl.

$C_1$–$C_4$alkanoyloxy is for example acetyloxy, propionyloxy or butyryloxy.

$C_5$–$C_{12}$cycloalkyl is for example cyclopentyl, cyclohexyl or cyclooctyl. Cyclohexyl is preferred.

$C_7$–$C_9$aralkyl is in particular $C_7$–$C_9$phenylalkyl, for example benzyl, α-methylbenzyl, α,α-dimethylbenzyl or phenylethyl. Benzyl is preferred.

$C_1$–$C_{18}$alkylene is for example methylene, dimethylene, trimethylene, tetramethylene, pentamethylene, hexamethylene, heptamethylene, octamethylene, decamethylene, dodecamethylene or octadecamethylene.

For compounds of formula II when r is 1, Q₁ is a bivalent hydrocarbon can be e.g. straight-chain or branched $C_2$–$C_{10}$alkylene or $C_2$–$C_6$alkylidene such as, for example, ethylene, ethylidene, trimethylene, tetramethylene, pentamethylene, 2,2-dimethylpropane-1,3-diyl, hexamethylene, heptamethylene, octamethylene, decamethylene, 2,2-pentamethylene-propane-1,3-diyl, and cyclohexylene or $C_6$–$C_{10}$arylene such as, for example, phenylene, phenylene substituted by one or more $C_1$–$C_4$alkyl, or naphthylene.

Q₁ as a trivalent, tetravalent or pentavalent hydrocarbon can be e.g. a group of the following formulae

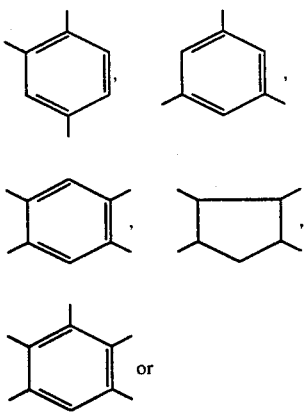

alkanetriyl of 3 to 6 carbon atoms, such as e.g. glyceryl or trimethylylpropane or alkanetetrayl of 4 to 6 carbon atoms such as e.g. pentaerythrityl.

Formula Ia represents preferably one of the following groups:

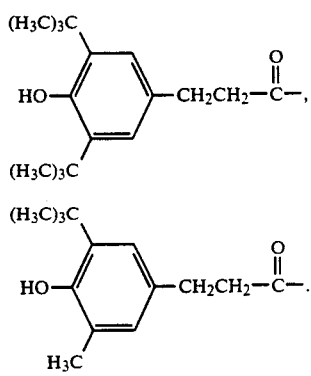

Formula Ib is in particular one of the groups

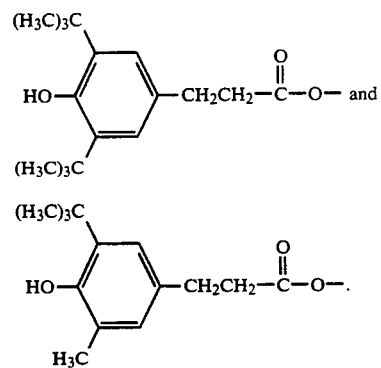

In the group of the formula IIa when r is O, f is preferably 1 or 2.

Those compositions are preferred, wherein component (a) is a compound of the formula I, II, III, IV, V or VI, in particular I, II, III or IV.

Z is preferably a direct bond or $C_1$–$C_6$alkylene.

Compounds of formula I which are preferred exhibit X as oxygen, b as an integer from 0 to 2, $R_2$ and $R_3$ as alkyl of 1 to 8 carbon atoms, A as oxygen, y as 2, $R_4$ as hydrogen or a group of the formula Ia. Particularly preferred are those compounds wherein $R_2$ and $R_3$ are tert-butyl positioned ortho to the hydroxyl group and b is 2. Compounds of preference are octadecyl 3-(3',5'-di-tert-butyl-4'-hydroxyphenyl) propionate and 2-ethylhexyl 3-(3',5', -di-tert.butyl-4-hydroxyphenyl)propionate.

Compounds of formula II which are preferred exhibit $R_2$ and $R_3$ as $C_1$–$C_8$alkyl, in particular tert-butyl positioned ortho to the hydroxyl group, b as 2, d as 2 or 4 and $Q_1$ as $C_2$–$C_{10}$alkylene or pentaerythritol. Specific compounds of preference are 1,6-hexamethylene bis[3',5'-di-tert-butyl-4'-hydroxyhydrocinnamate] and tetrakis[methylene 3-(3',5'-di-tert-butyl-4'-hydroxyphenyl)propionate]methane. A preferred compound of formula II when $Q_1$ is formula IIa is tris(3,5-di-tert.butyl-4-hydroxybenzyl)isocyanurate.

Compounds of formula III which are preferred exhibit $R_2$ and $R_3$ as $C_1$–$C_8$alkyl and preferably tert-butyl positioned ortho to the hydroxyl group, b as 2 and $Q_2$ as $C_2$–$C_6$alkylene. The specific compound of preference is N,N'-hexamethylene bis[3,5-di-tert-butyl-4-hydroxyhydrocinnamide].

Compounds of formula IV which are preferred exhibit X and Y as oxygen, b as an integer from 0 to 2, $R_2$ and $R_3$ as alkyl of 1 to 8 carbon atoms, z as 2, e as an integer from 3 to 20, and $R_5$ as a group of the formula Ia. Particularly preferred are those compounds wherein $R_2$ and $R_3$ are tert-butyl positioned ortho to the hydroxyl group. A specific compound of preference is triethylene glycol bis[3-(3'-tert-butyl-5'-methyl-4'-hydroxyphenyl)propionate].

Compounds of formula VI which are preferred exhibit $R_6$ and $R_7$ as methyl or tert-butyl and $R_8$ and $R_9$ as hydrogen or methyl. Specific compounds of preference are bis[2-hydroxy-3-tert-butyl-5-methylphenyl]methane and 1,1-bis[2'-hydroxy-3',5'-di-tert-butylphenyl]ethane.

A preferred compound of formula VII is

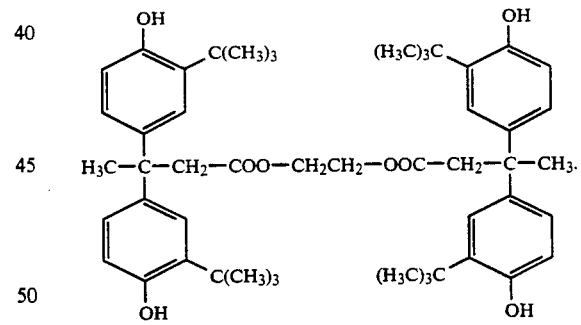

A preferred compound of formula VIII has $R_{10}$ as $C_1$–$C_4$alkyl and most preferably methyl, $R_{11}$ as $C_8$–$C_{12}$alkyl and most preferably n-octyl, and $R_{13}$ as hydrogen.

Applicable phosphites correspond to the formulae

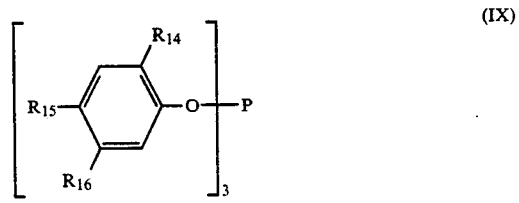

(IX)

wherein $R_{14}$ is tert.butyl, 1,1-dimethylpropyl, cyclohexyl or phenyl, and one of $R_{15}$ and $R_{196}$ is hydrogen and the other is hydrogen, methyl, tert.butyl, 1,1-dimethylpropyl, cyclohexyl or phenyl;

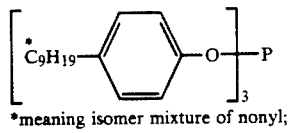

*meaning isomer mixture of nonyl;

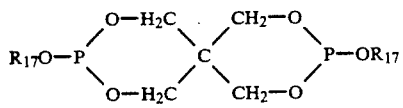

wherein
$R_{17}$ is n-$C_{18}H_{37}$,

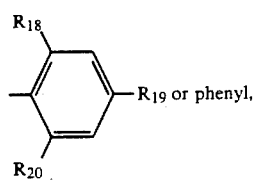

$R_{18}$, $R_{19}$ and $R_{20}$ independently are $C_1$-$C_{18}$alkyl, $R_{20}$ is also hydrogen and $R_{19}$ is also D-$COOR_{21}$ wherein D is a direct bond, methylene or ethylene and $R_{21}$ is $C_1$-$C_{18}$alkyl and

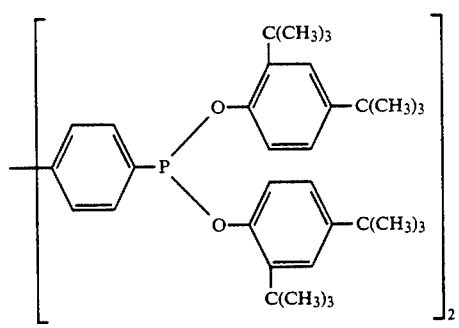

A preferred compound of formula IZ is tris(2,4-di-tert.butylphenyl)phosphite. A preferred compound of formula XI is bis(2,4di-tert.butylphenyl)pentaarythitol diphosphite.

Applicable acid scavengers incolude epoxidized oils and alkali metal and alkaline earth metal salts of higher fatty acids. The epoxidized oil is readily miscible in the adhesive formation. Typical oils include epoxidized soy bean oil, epoxidized caster oil, epoxidized linseed oil and epoxidized sunflower oil. Typical salts include calcium stearate, zinc stearate, magnesium stearate, sodium ricinoleate, potassium palmitate, antimony pyrocatecholate or tin pyrocatecholate. Amines are also applicable including alkanolamines such as triethanolamine and sterically hindered amines such as bis-(2,2,6,6-tetramethylpiperidyl)-sebacate, bis-(1,2,2,6,6-pentamethylpiperidyl)-sebacate, n-butyl-3,5-di-tert.butyl-4-hydroxybenzyl malonic acid, bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert.octylamino-2,6-dichloro-1,3,5-s-triazine, tris-(2,2,6,6-tetramethylpiperidyl)-nitrolotriacetate, tetrakis-(2,2,6,6-tetramethyl-4-piperidyl)-1,2,3,4-butane-tetracarbonic acid and 1,1,'-(1,2-ethanediyl)-bis-(3,3,5,5-tetramethylpiperazinone).

The concentrations (by weight) of the respective components in the stabilizer system are as follows: from about 25 to 74% of hindered phenol: and preferably 47.5%; from 5 to 74% of phosphite co-stabilizer, and preferably 25 to 74% and most preferably 47.5%; and from about 2 to 50% of acid scavenger, preferably 2 to 10% and most preferably 5%. The total amount of stabilizer system added to the adhesive component is from about 0.1-2.5%, by weight of total adhesive formulation, and preferably 0.5-1.0%.

Additional stabilizers may be optionally incorporated into the adhesive compositions. Such additives include other antioxidants, light stabilizers and the like. Blends including mixed alkylated diphenylamine antioxidants are particularly preferred. Typical alkyl groups include $C_4$-$C_{18}$ alkyls.

The adhesive compositions of the present invention are typically prepared by blending the components at an elevated temperature, preferably between about 130° C. and about 200° C., until a homogeneous blend is obtained, usually less than three (3) hours. Various methods of blending are known to the art and any method that produces a homogeneous blend is satisfactory. The resultant adhesives may then preferably be used in a wide variety of product assembly applications.

The following examples illustrate the preferred embodiments of the invention. In these examples, all parts and percentages given are by weight unless otherwise noted.

The following materials are employed in these examples:

"Adhesive"-1:1:1 weight ratio of ethylene-vinyl acetate copolymer (ELVAX 250 from DuPont): hydrogenated hydrocarbon tackifier (ARKON P-90 from Arakawa Chemical): microcrystalline wax (Bareco BE Square 195 from Petrolite).

A. tetrakis[methylene 3-(3',5'-di-tert.butyl-4'-hydroxyphenyl)propionate]methane
B. thiodiethylene bis(3,5di-tert.butyl-4hydroxy)hydrocinnamate
C. octadecyl 3-(3',5'-di-tert.butyl-4'-hydroxyphenyl)-propionate
D. triethylene glycol bis[3-(3'-tert.butyl-5'-methyl-4'-hydroxyphenyl)propionate]
E. 1,3,5-trimethyl-2,4,6-tris(3',5'-di-tert.butyl-4'-hydroxybenzyl)benzene
F. 2,6-di-tert.butyl-p-cresol
G. tris(3,5-di-tert.butyl-4-hydroxybenzyl) isocyanurate
H. 1,6-hexamethylene bis(3,5-di-tert.butyl-4-hydroxyhtdrocinnamate
I. 2,4-bis(n-octylthiomethyl)-6-methylphenol
J. tris(2,4-di-tert.butylphenyl)phosphite
K. bis(2,4-di-tert.butylphenyl)pentaerythritol diphosphite
L. tris(4-nonylphenyl)phosphite
M. epoxidized soy bean oil (Drapex 6.8 from Witco Chemical)
N. epoxidized soy bean oil (Flexol from Union Carbide)
P. (alkylated mixture)diphenylamine
Q. calcium stearate

EXAMPLE 1

This Example illustrates the adverse effects of phosphites on ethylene-vinyl acetate hot melt systems containing hydrogenated hydrocarbon tacktifiers.

The adhesive composition ("Adhesive") and additives are blended until homogeneous. Samples are then maintained in an oven at 177° C. and measured for color at periodic intervals utilizing a Gardner Color Scale.

Additionally, melt viscosity of the sample is determined using a Brookfied Viscometer (spindle #21, 177° C.) and comparing the 177° C. melt viscosity after 96 hours oven aging to the initial melt viscosity.

The following results are obtained.

|          |           | Gardner Color at 177° C. |    |    |        |
|----------|-----------|---|----|----|--------|
| Additive | Conc. (%) | 0 | 24 | 48 | 96 hrs |
| —        | —         | 0 | 6  | 11 | 13     |
| A        | 0.5       | 0 | 3  | 5  | 8      |
| A        | 1.0       | 0 | 3  | 4  | 7      |
| A/J (1:1)| 0.5       | 0 | 2  | 4  | 11     |
| A/J (1:1)| 1.0       | 0 | 3  | B  | B      |
| A/K (1:1)| 1.0       | 0 | 2  | 4  | 10     |
| A/L (1:1)| 0.5       | 0 | G  | B  | B      |
| A/L (1:1)| 1.0       | 0 | G  | B  | B      |
| A/J (1:1)*| 1.0      | 0 | G  | G  | B      |

*contains hydrogenated hydrocarbon tackifier (ESCOREZ 5300 from Exxon)
G — gray coloration
B — black coloration

EXAMPLE 2

This Example illustrates the improved performance characteristics provided by the compositions of this invention.

The following data is generated using the procedure of Example 1.

|          |              | Gardner Color |   |    |    |    | % Δ Melt Visc. at 96 hrs. |
|----------|--------------|---|---|----|----|----|------|
| Additive | Conc. %      | 0 | 24| 48 | 72 | 96 |      |
| I.   |              |   |   |    |    |    |      |
| A        | 0.5          | 1 | 2 | 3  | 5  | 6  | +5   |
| A        | 1.0          | 1 | 2 | 3  | 4  | 6  | +15  |
| A/J      | 0.5/0.5      | 1 | 3 | G  | —  | —  | +21  |
| A/J/M    | 0.5/0.5/0.05 | 1 | 1 | 2  | 3  | 4  | +12  |
| A/J/N    | 0.5/0.5/0.05 | 1 | 2 | 2  | 3  | 4  | +12  |
| II.  |              |   |   |    |    |    |      |
| A/J      | 0.5/0.5      | 1 | 3 | G  | —  | —  | +18  |
| A/J/M    | .495/.495/.01| 1 | 2 | 5  | G  | —  | +12  |
| A/J/M    | .49/.49/.02  | 1 | 2 | 3  | 4  | 5  | +10  |
| A/J/M    | .485/.485/.03| 1 | 2 | 3  | 3  | 4  | +8   |
| A/J/M    | .48/.48/.04  | 1 | 2 | 3  | 3  | 4  | +5   |
| A/J/M    | .475/.475/.05| 1 | 2 | 3  | 3  | 4  | +3   |
| III. |              |   |   |    |    |    |      |
| A/J/M    | .475/.475/.05| 1 | 2 | 3  | 4  | 5  | +25  |
| A/J/M    | .356/.356/.038| 1| 2 | 3  | 4  | 5  | +25  |
| A/J/M    | .238/.238/.024| 1| 2 | 3  | 5  | 7  | +25  |
| IV.* |              |   |   |    |    |    |      |
| —        | —            | 0 | 8 | 9  | 11 | 12 | —    |
| A        | 1.0          | 0 | 2 | 5  | 6  | 7  | —    |
| A/J      | 0.5/0.5      | 0 | 3 | G  | —  | —  | —    |
| A/J/M    | .475/.475/.05| 0 | 1 | 2  | 2  | 3  | —    |
| A/J/M    | .49/.49/.02  | 0 | 0 | 1  | 2  | 3  | —    |
| V.   |              |   |   |    |    | 120 hrs. |  |
| —        | —            | 0 | 7 | 10 | 11 | 12 | 13   |
| A        | 0.5          | 0 | 3 | 3  | 4  | 4  | 6    |
| A        | 1.0          | 0 | 3 | 3  | 4  | 4  | 6    |
| A/M      | .5/.025      | 0 | 3 | 3  | 4  | 4  | 6    |
| A/Q      | .5/.025      | 0 | 3 | 4  | 7  | 7  | 8    |

|          |           | Gardner Color |   |    |    |    |
|----------|-----------|---|---|----|----|----|
| Additive | Conc. %   | 0 | 24| 48 | 72 | 96 |
| J        | 0.5       | 0 | 2 | G  | G  | G  | G |
| J/M      | .5/.025   | 0 | 2 | 6  | 10 | 11 | 12 |
| J/Q      | .5/.025   | 0 | 3 | 6  | 9  | 11 | 12 |
| A/J      | .5/.5     | 0 | 4 | 8  | B  | B  | B |
| A/J/M    | .5/.5/.05 | 0 | 1 | 1  | 2  | 3  | 5 |
| A/J/Q    | .5/.5/.05 | 0 | 1 | 1  | 3  | 4  | 5 |

*Escorez 5300 tackifier

EXAMPLE 3

The procedures of Example 1 are repeated with a series of additional hindered phenols.

|          |              | Gardner Color |   |    |    |    |
|----------|--------------|---|---|----|----|----|
| Additive | Conc. (%)    | 0 | 24| 48 | 72 | 96 |
| —        | —            | 0 | 6 | 9  | 11 | 12 |
| J        | 1.0          | 0 | G | B  | —  | —  |
| A        | 1.0          | 0 | 3 | 5  | 5  | 5  |
| A/J      | 0.5/0.5      | 0 | 4 | B  | —  | —  |
| A/J/M    | .475/.475/.05| 0 | 3 | 3  | 4  | 6  |
| B        | 1.0          | 0 | 4 | 5  | 10 | 11 |
| B/J      | 0.5/0.5      | 0 | G | B  | —  | —  |
| B/J/M    | .475/.475/.05| 0 | 3 | 3  | 4  | 6  |
| C        | 10           | 0 | 4 | 5  | 5  | 6  |
| C/J      | 0.5/0.5      | 0 | 5 | B  | —  | —  |
| C/J/M    | .475/.475/.05| 0 | 3 | 4  | 4  | 4  |
| D        | 1.0          | 0 | 5 | 6  | 7  | 7  |
| D/J      | 0.5/0.5      | 0 | G | B  | —  | —  |
| D/J/M    | .475/.475/.05| 0 | 3 | 5  | 6  | 6  |
| E        | 1.0          | 0 | 6 | 6  | 7  | 7  |
| E/J      | 0.5/0.5      | 0 | G | B  | —  | —  |
| E/J/M    | .475/.475/.05| 0 | 3 | 4  | 5  | 6  |
| F        | 1.0          | 0 | 6 | 9  | 10 | 10 |
| F/J      | 0.5/0.5      | 0 | 4 | B  | —  | —  |
| F/J/M    | .475/.475/.05| 0 | 3 | 3  | 4  | 6  |
| G        | 1.0          | 0 | 5 | 6  | 7  | 7  |
| G/J      | 0.5/0.5      | 0 | G | B  | —  | —  |
| G/J/M    | .475/.475/.05| 0 | 3 | 3  | 3  | 4  |
| H        | 1.0          | 0 | 4 | 6  | 6  | 7  |
| H/J      | 0.5/0.5      | 0 | G | B  | —  | —  |
| H/J/M    | .475/.475/.05| 0 | 2 | 3  | 3  | 4  |
| I        | 1.0          | 0 | 4 | 6  | 10 | 12 |
| I/J      | 0.5/0.5      | 0 | G | B  | —  | —  |
| I/J/M    | .475/.475/.05| 0 | 3 | 6  | 11 | 11 |
| P/A      | 0.5/0.5      | 0 | 4 | 5  | 6  | 7  |
| P/A/J    | .25/.25/.5   | 0 | 5 | B  | —  | —  |
| P/A/J/M  | 24/.24/.47/.05| 0| 1 | 2  | 3  | 4  |

The data in Examples 2 and 3 clearly illustrates the significantly improved stabilization characteristics provided to the ethylene-vinyl acetate hot melt adhesive formulations.

Summarizing, it is seen that this invention provide improved stabilization systems for use in ethylene-vinyl acetate hot melt adhesive compositions containing hydrogenated hydrocarbon tackifying resins. Variations may be made in procedures, proportions and materials without departing from the scope of the invention as defined by the follwoing claims.

What is claimed is:

1. A stabilized hot melt adhesive composition comprising
   (a) ethylene-vinyl acetate copolymer;
   (b) an effective tackifying amount of a hydrocarbon tackifying resin; and
   (c) an effective stabilizing amount of a stabilizer composition comprising
      (1) a phenolic antioxidant;
      (2) a phosphite co-stabilizer; and (3) an acid scavenger selected from the group consisting of epoxidized oils, alkali metal salts of higher fatty acids, alkaline earth metal salts of higher fatty acids and amines.

2. The composition of claim 1, wherein said hydrocarbon tackifying resin is selected from the group consisting of aliphatic petroleum hydrocarbon resins and hydrogenated derivatives thereof, aromatic petroleum hydrocarbon resins and hydrogenated derivatives thereof and alicyclic petroleum hydrocarbon resins and hydrogenated derivatives thereof, polyterpene hydrocarbon resins and hydrogenated derivatives thereof, and mixtures thereof.

3. The composition of claim 2, wherein said hydrocarbon tackifying resin is hydrogenated.

4. The composition of claim 1, wherein components (a) and (b) are present in a weight ratio of 10:90 to 90:10.

5. The composition of claim 4, wherein components (a) and (b) are present in a weight ratio of 25:75 to 75:25.

6. The composition of claim 1, which additionally contains (d) up to 50%, by weight of components (a) and (b), of a petroleum derived wax.

7. The composition of clain 6, wherein components (a), (b) and (d) are present in a weight ratio of 1:1:1.

8. The composition of claim 1, wherein said hindered phenolic antioxidant corresponds to the formula

  (I)

wherein $R_1$ is a group of the formula Ia,

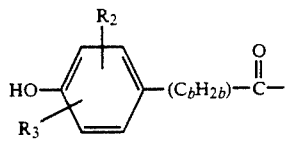 (Ia)

X is oxygen or sulfur, a is an integer from 6 to 30, be is an integer from 0 to 6, $R_2$ and $R_3$ are independently $C_1$-$C_{18}$alkyl, $C_5$-$C_{12}$cycloalkyl, phenyl or $C_7$-$C_9$aralkyl, and $R_2$ is also hydrogen, Q is hydrogen or —A—$(C_yH_{2y})$—$R_4$, A is oxygen, sulfur or

y is an integer from 2 tro 20,

B is $C_1$-$C_4$alkyl or $C_1$-$C_4$alkanoyl, and $R_4$ is hydrogen, hydroxy, $C_1$-$C_4$alkanoyloxy or a group of the formula Ib,

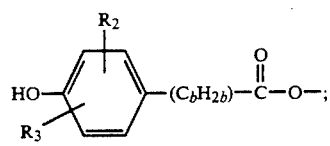 (Ib)

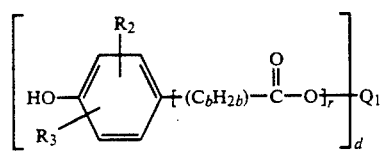 (II)

wherein $R_2$, $R_3$ and b are as defined above, r is 1, d is an integer from 2 to 6, and $Q_1$ is a divalent aliphatic hydrocarbon of 1 to 18 carbon atoms, a divalent aromatic or aromatic aliphatic hydrocarbon of 6 to 20 carbon atoms or a group of the formula IIa when r is also 0

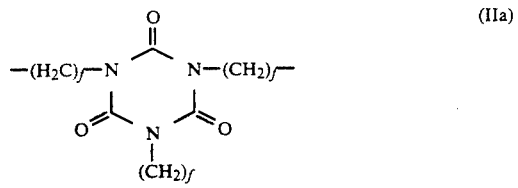 (IIa)

wherein f is an integer from 1 to 4;

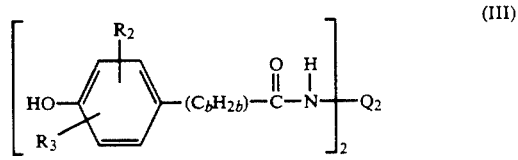 (III)

wherein $R_2$, $R_3$ and b are as defined above, and $Q_2$ is $C_1$-$C_{18}$alkylene;

 (IV)

wherein $R_1$ and X are as defined above, z is an integer from 2 to 6, e is an integer from 3 to 40, Y is oxygen or sulfur, and $R_5$ is hydrogen, $C_1$-$C_4$alkyl or a group of the formula Ia;

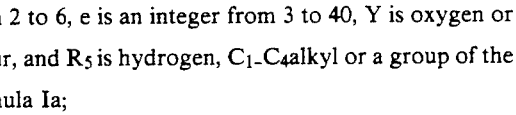 (V)

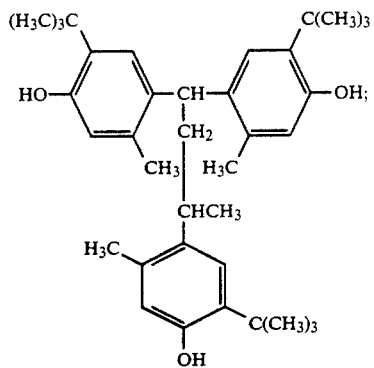 (VI)

wherein $R_6$ and $R_7$ are independently $C_1$-$C_{18}$alkyl, $C_5$-$C_{12}$cycloalkyl, phenyl or $C_7$-$C_9$aralkyl, and $R_6$ is also hydrogen, and $A_1$ is a group >$C(R_8)R_9$ wherein $R_8$ and $R_9$ are independently hydrogen or $C_1$-$C_6$alkyl;

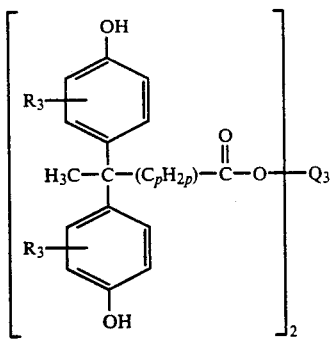
(VII)

wherein R$_3$ is defined above, p is 1 or 2 and Q$_3$ is C$_2$-C$_{10}$alkylene; or

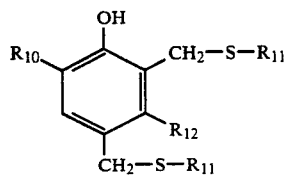
(VIII)

wherein
R$_{10}$ is C$_1$-C$_{10}$alkykl or C$_5$-C$_{12}$cycloalkyl,
R$_{11}$ independently is C$_1$-C$_{18}$alkyl, phenyl or benzyl and
R$_{12}$ is hydrogen or methyl.

9. The composition of claim 1, wherein the hindered phenolic antioxiant corresponds to forumla I and X is oxygen, b is an interger from 0 to 2, R$_2$ and R$_3$ are alkyl of 1 to 8 carbon atoms, A is oxygen, y is 2 and R$_4$ is hydrogen or a group of the formula Ia.

10. The composition of claim 9, wherein the hindered phenolic antioxidant is octadecyl 3-(3',5'-di-tert-butyl-4'-hydroxyphenyl)propionate or 2-ethylhexyl-3-(3'-5'-di-tert.butyl-4-hydroxyphenyl)propionate.

11. The composition of claim 8, wherein the hindered phenolic antioxidant corresponds to formula II and r is 1, R$_2$ and R$_3$ are C$_1$-C$_8$alkyl, b is 2, d is 2 or 4 and Q$_1$ is C$_2$-C$_{10}$alkylene or pentaerythritol.

12. The composition of claim 11, wherein the hindered phenolic antioxidant is 1,6-hexamethylene bis[3'-5'-di-tert-butyl-4'-hydroxyhydrocinnamate] or tetrakis[-methylene 3-(3'-5'-di-tert-butyl-4'-hydroxyphenyl)propionate]methane.

13. The composition of claim 8, wherein the hindered phenolic antioxidant corresponds to formula II, r is 0 and Q$_1$ is formula IIa.

14. The composition of claim 8, wherein the hindered phenolic antioxidant corresponds to formula III and R$_2$ and R$_3$ are C$_1$-C$_8$alkyl, b is 2 and Q$_2$ is C$_2$-C$_6$alkylene.

15. The composition of claim 8, wherein the hindered phenolic antioxidant corresponds to formula IV and X and Y are oxygen, b is 0-2, R$_2$ and R$_3$ are C$_1$-C$_8$ alkyl, z is 2, e is 3-20 and R$_5$ is a group of formula Ia.

16. The composition of claim 8, wherein the hindered phenolic antioxidant corresponds to formula VI and R$_6$ and R$_7$ are methyl or tert.butyl and R$_8$ and R$_9$ are hydrogen or methyl.

17. The composition of claim 8, wherein the hindered phenolic antioxidant corresponds to formula VIII and R$_{10}$ is C$_1$-C$_4$ alkyl, R$_{11}$ is C$_8$-C$_{12}$ alkyl and R$_{13}$ is hydrogen.

18. The composition of claim 1, wherein said phosphite co-stabilizer corresponds to the formulae

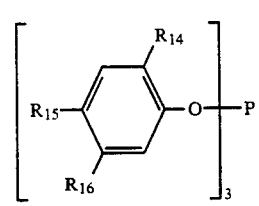
(IX)

wherein
R$_{14}$ is tert.butyl, 1,1-dimethylpropyl, cyclohexyl or phenyl, and one of
R$_{15}$ and R$_{16}$ is hydrogen and the other is hydrogen, methyl, tert.butyl, 1,1-dimethylpropyl, cyclohexyl or phenyl;

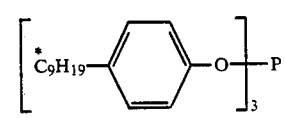
(X)

*indicates an isomeric mixture of C$_9$—H$_{19}$;

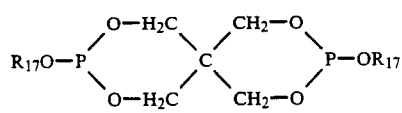
(XI)

wherein R$_{17}$ is n-C$_{18}$H$_{37}$,

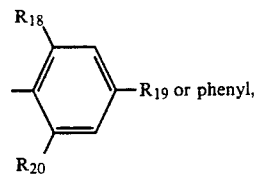
R$_{19}$ or phenyl,

R$_{18}$, R$_{19}$ and R$_{20}$ independently are C$_1$-C$_{18}$alkyl, R$_{20}$ is also hydrogen and
R$_{19}$ is also D—COOR$_{21}$ wherein D is a direct bond, methylene or ethylene and R$_{21}$ is C$_1$-C$_{18}$alkyl; or

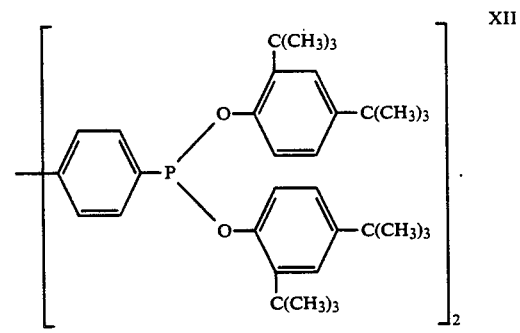
XII

19. The composition of claim 18, wherein the phosphite corresponds to formula IX and is tris(2,4-di-tert.butylphenyl)phosphite.

20. The composition of claim 18, wherein the phosphite corresponds to formula X.

21. The composition of claim 18, wherein the phosphite corresponds to formula XI.

22. The composition of claim 1, wherein said acid scavenger is epoxidized soy bean oil, epoxidized castor oil, epoxidized linseed oil or epoxidize sunflower oil.

23. The composition of claim 1, wherein said acid scavenger is calcium stearate.

24. The composition of claim 1, wherein the relative concentration of components (c)(1),(c) (2) and (c)(3) are 25 to 74%, 5 to 74% and 2to 50%, by weight of component (c).

25. The composition of claim 24, wherein said relative concentrations are 47.5%, 47.5% and 5%, by weight of component (c).

26. The composition of claim 1, wherein component (c) is present in a concentration of 0.1-2.5%, by weight of the total adhesive composition.

27. The composition of claim 1, wherein said hindered phenolic antioxidant is selected from the group consisting of tetrakis[methylene-3-(3'-5'-di-tert.butyl-4'-hydroxyphenyl)-propionate]methane, thiodiethylene bis(3,5-di-tert.butyl-4-hydroxy)hydrocinnamate, octadecyl3-(3',5'-di-tert.butyl-4'-hydroxyphenyl)propionate, triethylene glycol bis-[3-(3'-tert.butyl-5'-methyl-4'-hydroxyphenyl)propionate], 1,3,5-trimethyl-2,4,6-tris-(3',5'-di-tert.butyl-4'-hydroxybenzyl)benzene,2,6-di-tert. butyl-p-cresol, tris(3,5-di-tert.butyl-4-hydroxybenzyl)isocyanurate,1,6-hexamethylene bis(3,5-di-tert.butyl-4-hydroxy-hydrocinnamate, and 2,4-bis(n-octylthiomethyl)-6-methylphenol; said phosphite co-stabilizer is selected from the group consisting of tris(2,4-di-tert.butylphenyl)phosphite, bis(2,4-di-tert.butylphenyl)pentaerythritol diphosphite, and tris(4-nonylphenyl)phosphite; and said acid scavenger is epoxidized soy bean oil or calcium stearate.

28. The composition of claim 1, which additionally contains (e) a (mixed alkylated) diphenylamine antioxidant.

29. A method for stabilizing a hot melt adhesive composition comprising an ethylene-vinyl acetate copolymer and an effective tackifying amount of a hydrocarbon tackifying resin against oxidative and thermal degradation which comprises incorporating into said hot melt adhesive composition an effective oxidative and thermal stabilizing amount of (1) a phenolic antioxidant, (2) a phosphite co-stabilizer and (3) an acid scavenger selected from the group consisting of epoxidized oils, alkali metal salts of higher fatty acids and alkaline earth metal salts of higher fatty acids and amines.

* * * * *